(12) United States Patent
Winterholler

(10) Patent No.: US 9,074,690 B2
(45) Date of Patent: Jul. 7, 2015

(54) SHUT-OFF VALVE FOR THE PLUMBING SECTOR

(75) Inventor: Arthur Winterholler, Attendorn (DE)

(73) Assignee: VIEGA GMBH & CO. KG, Attendorn (DE)

( * ) Notice: Subject to any disclaimer, the term of this patent is extended or adjusted under 35 U.S.C. 154(b) by 259 days.

(21) Appl. No.: 13/695,401

(22) PCT Filed: Apr. 27, 2011

(86) PCT No.: PCT/EP2011/056613
§ 371 (c)(1),
(2), (4) Date: Oct. 30, 2012

(87) PCT Pub. No.: WO2012/019790
PCT Pub. Date: Feb. 16, 2012

(65) Prior Publication Data
US 2013/0048892 A1   Feb. 28, 2013

(30) Foreign Application Priority Data

Aug. 10, 2010   (DE) .......................... 10 2010 033 952

(51) Int. Cl.
| | | |
|---|---|---|
| F16K 11/00 | (2006.01) | |
| F16K 5/06 | (2006.01) | |
| F16K 11/087 | (2006.01) | |
| F16K 11/18 | (2006.01) | |

(52) U.S. Cl.
CPC ......... *F16K 5/0605* (2013.01); *Y10T 29/49405* (2013.01); *F16K 5/0647* (2013.01); *F16K 11/0876* (2013.01); *F16K 11/18* (2013.01)

(58) Field of Classification Search
CPC ... F16K 11/0876; F16K 11/18; F16K 5/0605; F16K 5/0647; Y10T 29/49405
USPC ............................... 137/596, 625.21; 251/304
See application file for complete search history.

(56) References Cited

U.S. PATENT DOCUMENTS

| | | | | |
|---|---|---|---|---|
| 3,191,906 A | * | 6/1965 | Zeigler et al. | ................. 251/208 |
| 3,464,449 A | * | 9/1969 | Morton | ..................... 137/625.24 |
| 3,605,792 A | * | 9/1971 | Westbrook | ..................... 137/312 |
| 3,770,016 A | * | 11/1973 | Johnstone et al. | ....... 137/625.22 |
| 4,172,584 A | | 10/1979 | Legris | |

(Continued)

FOREIGN PATENT DOCUMENTS

| | | |
|---|---|---|
| DE | 819250 B | 7/1949 |
| DE | 2655861 A1 | 6/1977 |

(Continued)

*Primary Examiner* — Craig Schneider
*Assistant Examiner* — Minh Le
(74) *Attorney, Agent, or Firm* — Rankin, Hill & Clark LLP

(57) ABSTRACT

A shut-off valve for the plumbing sector for shutting off a line through which a fluid can flow that preferably includes a housing having at least two connecting pieces. A flow path is defined from one of the connecting pieces through the housing to another of the connecting pieces, and a shut-off body is disposed rotatably in the housing with a single shut-off section running crosswise to the flow path. Preferably, the shut-off segment is constituted as a spherical segment, and the shut-off body can be moved between a closed position in which the flow path is completely blocked to only one of the connecting pieces and an open position in which the flow path is completely clear. A switching shaft which is rotatably mounted in the housing and is connected in a rotationally fixed manner at its one end to the shut-off body.

17 Claims, 6 Drawing Sheets

(56) References Cited

U.S. PATENT DOCUMENTS

Figure 1:
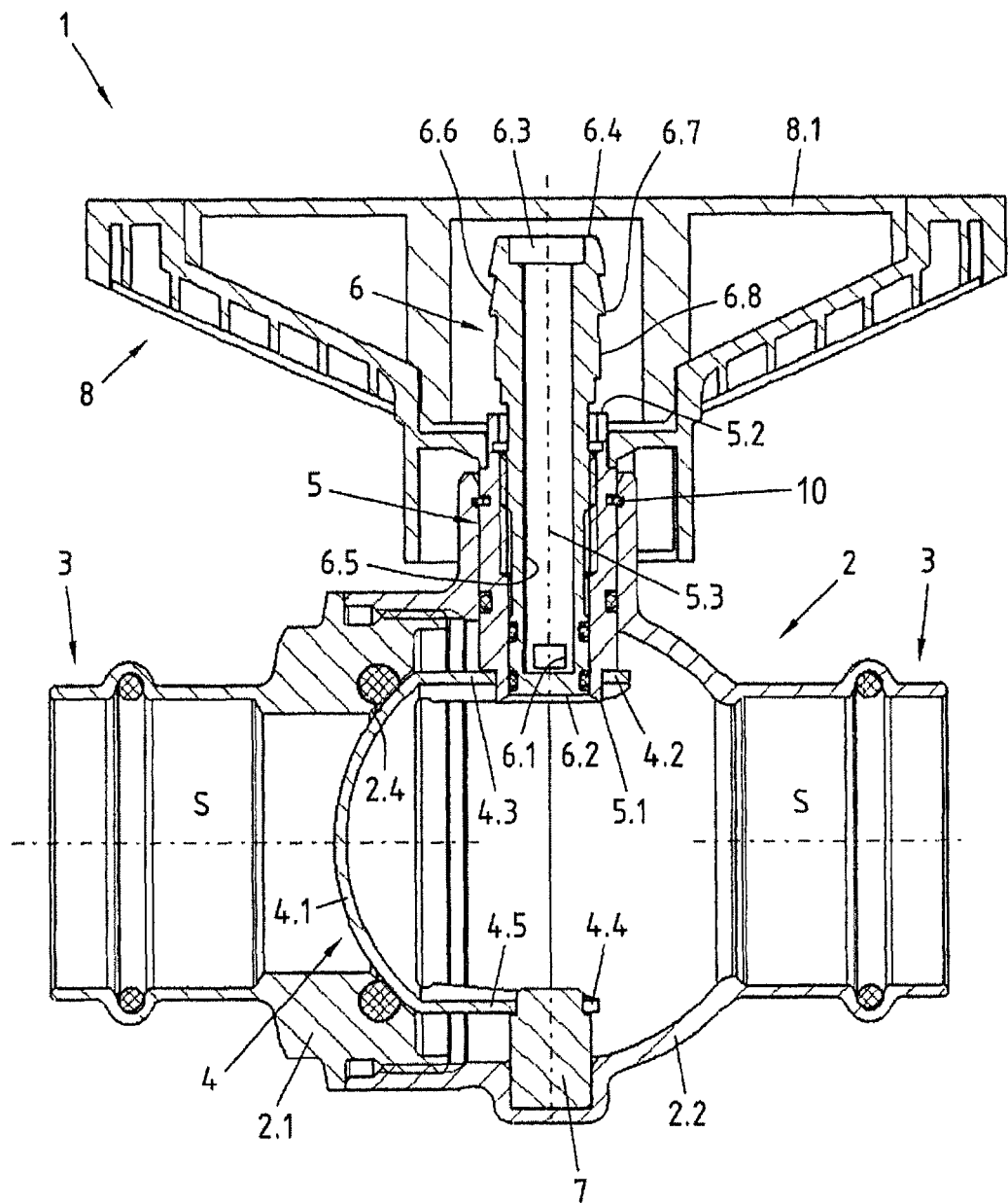

| | | | |
|---|---|---|---|
| 4,257,576 A | | 3/1981 | Legris |
| 4,962,911 A | * | 10/1990 | Soderberg ................ 251/159 |
| 5,016,857 A | * | 5/1991 | Bovee et al. ............... 251/304 |
| 5,145,150 A | * | 9/1992 | Brooks ...................... 251/188 |
| 5,170,992 A | * | 12/1992 | Lenberg .................... 251/304 |
| 5,255,706 A | * | 10/1993 | Chudakov ................ 137/637.3 |
| 6,378,842 B1 | * | 4/2002 | Frese et al. ................ 251/298 |
| 6,981,691 B2 | * | 1/2006 | Caprera ..................... 251/298 |
| 7,089,960 B2 | * | 8/2006 | Maruta ................... 137/625.22 |
| 7,506,858 B2 | * | 3/2009 | Brinks ....................... 251/304 |
| 8,308,132 B2 | * | 11/2012 | Partridge ................ 251/315.16 |
| 8,733,733 B2 | * | 5/2014 | Collison et al. ............ 251/174 |
| 2005/0285068 A1 | * | 12/2005 | Dalluge et al. ............. 251/304 |
| 2009/0256097 A1 | | 10/2009 | Hartung |
| 2010/0294968 A1 | * | 11/2010 | Teague, Jr. ................. 251/304 |

FOREIGN PATENT DOCUMENTS

| | | |
|---|---|---|
| DE | 7917036 U1 | 10/1979 |
| DE | 2918348 A1 | 11/1980 |
| DE | 3033240 A1 | 4/1982 |
| DE | 102008018507 A1 | 10/2009 |
| EP | 0786611 A1 | 7/1997 |
| GB | 2066931 A | 7/1981 |
| WO | 2008/067603 A1 | 6/2008 |

* cited by examiner

SHUT-OFF VALVE FOR THE PLUMBING SECTOR

The invention relates to a shut-off valve for the plumbing sector for shutting off a line through which a fluid can flow, with a housing comprising at least two connecting pieces, wherein a flow path is defined from one of the connecting pieces through the housing to another of the connecting pieces, with a shut-off body disposed rotatably in the housing with at least one shut-off section running crosswise to the flow path, wherein the shut-off body can be moved between a closed position in which the flow path is completely blocked and an open position in which the flow path is completely clear, wherein the at least one shut-off section at least partially blocks the flow path to one of the connecting pieces in the closed position, and with a switching shaft which is rotatably mounted in the housing and which is connected in a rotationally fixed manner at its one end to the shut-off body. Furthermore, the invention relates to such a shut-off valve with a hollow spindle mounted in the switching shaft which is constituted as a hollow shaft, with an inlet opening at its end facing the shut-off body, an outlet opening at its end facing away from the shut-off body and a drainage channel leading from the inlet opening to the outlet opening, wherein the hollow spindle can be displaced relative to the switching shaft from a first position, in which the drainage channel is in a fluid connection with the flow path via the inlet opening, into a second position, in which the inlet opening is closed.

A shut-off valve of the aforementioned kind, in particular a ball valve, cylinder valve, poppet valve or cone valve, has long been known and is used in diverse technical applications in various sizes. Two-channel and multi-channel shut-off valves are known. A two-channel shut-off valve, i.e. one with two connecting pieces, is known for example from DE 10 2008 018 507 A1.

The housing of the shut-off valve usually comprises two housing parts connected to one another, wherein a connecting piece for connecting the shut-off valve to the line is constituted on each side. The connection of the line sections to the connecting pieces can take place by screwing-on, welding-on or pressing.

By means of an actuation element which can be driven for example mechanically, electrically, pneumatically, electromagnetically or hydraulically, a shut-off body inside the housing of the shut-off valve is rotated normal to the flow path. The shut-off body, in the closed position of the shut-off valve, closes the flow channel in the following way. The previously known shut-off bodies for any form of shut-off valve of the previously described kind are designed rotation-symmetrical or mirror-symmetrical with respect to the axis of rotation, so that in the closed position a first shut-off section of the shut-off body completely blocks the flow path to one of the connecting pieces, whilst a second shut-off section, which usually lies opposite the first shut-off section, at least partially blocks the flow path to the other of the connecting pieces. "At least partially" means that, since the first shut-off section already completely blocks the flow path, the second shut-off section does not necessarily have to completely block the flow path, but rather can just reduce it. The aforesaid is the case, for example, when the shut-off valve comprises a drainage valve integrated into the switching shaft, as is known for example from DE 79 17 036 U1, wherein there is provided in the second shut-off section a first drainage bore running parallel to the flow path, which connects the flow path in the closed position of the shut-off valve to the main bore of the shut-off body, which clears the flow path in the open position, wherein the main bore is in turn in a fluid connection with the interior of the switching shaft via a second drainage bore in the shut-off body. Formed in the interior of the switching shaft is the drainage valve of a hollow spindle, which can be moved in the switching shaft between a position, in which the hollow spindle interior is sealed off with respect to the second drainage bore of the shut-off body and therefore with respect to the flow path, and a position in which the hollow spindle interior is in a fluid connection with the flow path via the drainage bores in the shut-off body. The presence of the first drainage bore in the second shut-off section means that the second shut-off section in this case does not completely block, but only partially blocks the flow path to the respective connecting piece. Since the section, however, lies adjacent to the housing in a sealing manner and at least reduces the flow path, the latter is also understood to mean a shut-off section within the meaning of the invention.

The shut-off valve according to DE 79 17 036 U1 is a cone valve with a cone-shaped or truncated pyramid-shaped shut-off body. As a result of the arrangement of the drainage valve inside the switching shaft, this shut-off valve has the advantage over the other prior art that it has smaller dimensions compared to the case in which the drainage valve is not integrated into the shut-off mechanism, but is provided independently thereof spaced apart from the shut-off mechanism in a region between the shut-off body and the connecting piece. The latter-mentioned installation situation, which necessarily leads to relatively large dimensions of the housing, continues to be the only known possibility for also implementing a drainage function in the case of ball valves, which therefore have a shut-off body with a surface that is spherical at least in sections.

The previously described cone valve with the drainage possibility via the switching shaft admittedly has relatively small dimensions, but it has the drawback that complete drainage is not possible. On account of the shape and the course of the drainage path, which leads via the interior of the connecting piece via the first drainage bore in the shut-off body, then the main bore in the shut-off body and finally via the second drainage bore in the shut-off body to the drainage valve, residues of fluid always remain in the shut-off body and in the connecting piece. The effect of fluid collecting in such a so-called dead space is that the latter, which is usually water, can freeze and the function of the shut-off valve is no longer provided. Moreover, the so-called dead water can lead to health-related problems. A through-flow direction is defined by a limit stop which is constituted as a so-called limiting pin and which is integrated in the base of the shut-off device. After the shutting-off, drainage can take place only in this one through-flow direction.

It is therefore an object of the present invention to develop further a shut-off valve of the type mentioned at the outset, which can therefore comprise a drainage valve, in such a way that the latter ensures both the smallest possible dimensions as well as drainage that is as complete as possible.

According to a first teaching of the present invention with a shut-off valve for the plumbing sector for shutting off a line through which a fluid can flow, with a housing comprising at least two connecting pieces, which can be connected to the line in particular by pressing, wherein a flow path is defined from one of the connecting pieces through the housing to another of the connecting pieces, with a shut-off body disposed rotatably in the housing with at least one shut-off section running crosswise to the flow path, wherein the shut-off body can be moved between a closed position in which the flow path is completely blocked and an open position in which the flow path is completely clear, wherein the at least one shut-off section at least partially blocks the flow path to one of the connecting pieces in the closed position, and with a switching shaft which is rotatably mounted in the housing and which is connected in a rotationally fixed manner at its one end to the shut-off body, the previously derived and presented problem is solved by the fact that the shut-off body comprises only a single shut-off section, wherein the shut-off body in the closed position blocks the flow path only to one of the connecting pieces, that the single shut-off section completely blocks the flow path and that the single shut-off section is constituted as a spherical segment.

Due to the fact that the shut-off valve comprises according to the invention a shut-off body which comprises only a single shut-off section, which in the closed position completely blocks the flow path and blocks the flow path only to one of the connecting pieces, i.e. the flow path to the other connecting piece remains completely clear and therefore unaffected, this shut-off valve is optimally suited to accommodating a drainage valve integrated into the switching shaft. If the drainage valve is constituted by a hollow spindle integrated into the switching shaft and capable of moving there, it is possible in the case of a drainage procedure, when the shut-off body is in the closed position, for the fluid to flow away unhindered via the drainage valve from the connecting piece which is unclosed and continues to be completely clear. In contrast with the prior art, therefore, apart from the shut-off section which completely blocks the flow path to one of the connecting pieces, according to the invention no further shut-off section is provided that partially blocks the flow path to the other of the connecting pieces or narrows it down to a drainage bore in the shut-off body that is relatively small compared to the cross-section of the flow path. During a drainage procedure, therefore, the fluid can flow away virtually unhindered via a drainage valve out of the interior of the non-blocked connecting piece, without the fluid being partially held back by parts of the shut-off body that consequently lead to a corresponding dead space. A further advantage of the formation of the shut-off body in a way such that only a single shut-off section blocks the flow path is that the housing, on the inside towards the connecting piece which is not blocked in the closed position, does not have to be fashioned for a sealing seating of a shaft section. As a result of the formation of the shut-off section as a spherical segment, in particular as a segment of a hollow sphere, complete flowing away of the fluid during a drainage procedure is moreover also assisted, apart from the optimum sealing of the flow path in the closed position. A shut-off valve as described above, therefore, can neither freeze, nor can it lead to health-related problems due to accumulating germs etc. At the same time, however, this shut-off valve is also relatively compact and has correspondingly small dimensions due to the possibility of integrating a drainage valve into the shut-off mechanism, i.e. into the switching shaft. Moreover, the shut-off valve or the drainage valve is always accessible without the shut-off valve having to be dismantled from the line. Finally, it is also advantageous that the valve can be used independently of the through-flow direction.

If need be, when no drainage function is desired, a shut-off valve as previously described can of course also be provided with a conventional switching shaft of solid material. In principle, it is also conceivable to close a switching shaft constituted as a hollow shaft with a spindle of solid material instead of with a hollow spindle providing a drainage function. It is essential to the invention that the shut-off valve described above creates only the possibility for it to be able to be drained in the optimum manner, with at the same time minimum dimensions even with the presence of a drainage valve, wherein this drainage possibility does not however necessarily have to be implemented.

Instead of a hollow spindle, a thermometer can also be inserted into the switching shaft, wherein the temperature of the fluid can be ascertained by direct contact of the thermometer with the fluid. The thermometer can also be inserted into the hollow spindle, as a result of which the temperature of the fluid can also be ascertained on account of the thermal connection between the hollow spindle, the switching shaft and the housing.

In the case where a drainage valve is to be provided, provision is made according to an embodiment of the ball valve according to the invention such that a hollow spindle mounted in the switching shaft, which is constituted as a hollow shaft, is provided with an inlet opening at its end facing the shut-off body, an outlet opening at its end facing away from the shut-off body and a drainage channel leading from the inlet opening to the outlet opening, wherein the hollow spindle can be displaced relative to the switching shaft from a first position, in which the drainage channel is in a fluid connection with the flow path via the inlet opening, into a second position, in which the inlet opening is closed, wherein the hollow spindle is formed in particular by at least two spindle parts connected rotatably to one another. In this way, a drainage valve is created with particularly straightforward means, without additional installation space being required.

As already pointed out above, the shut-off section of the shut-off body can be constituted as a segment of a hollow sphere or spherical shell. In principle, it is however also conceivable to constitute the shut-off section as a segment of a solid sphere. In principle, however, it must be ensured that, on account of optimum sealing behaviour, the single shut-off section is constituted as a spherical segment, i.e. has a spherical external surface, in other words the shut-off valve is thus a ball valve.

It is conceivable for the switching shaft to be connected only to the upper side of the shut-off body facing the switching shaft and in particular to project over not more than 10% of its length into the shut-off body. In the event of drainage, this assists optimum flowing-away of the fluid.

According to a further embodiment of the shut-off valve according to the invention, the shut-off body comprises a first connection section, by means of which the shut-off section is connected in a rotationally fixed manner to the switching shaft. The shut-off section is held spaced apart from the switching shaft by means of the connection section, for example in the form of a web, which also optimises the flowing-away of the fluid during the drainage procedure.

According to yet another embodiment of the shut-off valve according to the invention, the shut-off body is connected rotatably at its underside facing away from the switching shaft to the housing by means of a bearing element, wherein the bearing element is in particular a bolt connected to the housing on the inside and/or to the shut-off body. The shut-off body can comprise a second connection section, in particular also in the form of a web, by means of which the shut-off section is connected in a rotationally fixed manner to the bearing element. The shut-off body formed in the inventive manner is thus held in the optimum manner and, in the closed position, finds an optimally sealing seating on the inside in the housing in order to block the flow path to the corresponding connecting piece.

According to a further embodiment of the shut-off valve according to the invention, the shut-off section and the first and/or second connection section are constituted in one piece with one another, i.e. are formed from one piece. The production of the shut-off valve is thus simplified. An even simpler production operation can be achieved by the fact that the first connection section and the second connection section are constituted mirror-symmetrical with respect to one another.

Production can be further simplified by the fact that, according to a further embodiment of the shut-off valve according to the invention, the shut-off body is a sheet-metal shaped part which in particular has a uniform wall thickness. By the fact that a sheet-metal shaped part is used instead of a solid body, for example a segment of a solid sphere, the high cost for machining on the lathe becomes unnecessary. The high material consumption associated with the machining also becomes unnecessary, because according to the invention a sheet-metal part, which corresponds at least in sections to the subsequent shut-off body, merely has to be stamped out or shaped from raw sheet metal for the production of the shut-off body.

According to yet another embodiment of the shut-off valve according to the invention, the shut-off body has a U-shaped cross-section. Such a U-shape leads to minimisation of edges in the interior of the shut-off body, which assists the flowing-away of the fluid during drainage and reduces the risk of germs accumulating.

It is conceivable for more than 80%, preferably more than 90%, particularly preferably more than 95%, of the shut-off body to be disposed on one side of the central axis or axis of rotation of the switching shaft. Accordingly, less than 20%, preferably less than 10%, particularly preferably less than 5%, of the shut-off body is provided on the other side of the central axis or the axis of rotation of the switching shaft. Since, during the drainage procedure, the fluid flows from the unblocked connecting piece at least up to the central axis or axis of rotation of the switching shaft and from there coaxially with the switching shaft axis, the effect of arranging by far the greatest part of the shut-off body or shut-off body material on one side of the switching shaft axis is that as little material as possible of the shut-off body projects into the path of the fluid flowing away during the drainage procedure. This further facilitates the flowing-away.

According to yet another embodiment of the shut-off valve according to the invention, the housing comprises a first housing part, which contains one of the connecting pieces, and a second housing part, which contains another of the connecting pieces, wherein the two housing parts are connected to one another directly or via an intermediate piece. Either the intermediate piece or one of the housing parts can accommodate the switching shaft. A housing comprising only the two housing parts has a particularly straightforward structure and is accordingly easy to assemble. A three-part housing an intermediate piece opens up the possibility of identical housing parts being able to be fitted on both sides of the intermediate piece, which preferably accommodates the switching shaft, which also leads to simplified production. If need be, a choice can be made between various housing parts. For example, two housing parts can be selected, which both permit in each case a sealing seating of the single shut-off section of the shut-off body, so that each of the connecting pieces can be blocked by the shut-off body whilst leaving the respective other connecting piece clear, which in turn creates the possibility of draining the line on the one side of the shut-off valve or the line on the other side of the shut-off valve. In principle, in the case of the presence of an intermediate piece, only one housing part fitted thereon can be constituted with the possibility for a sealing seating of the shut-off body, whereas the other housing part does not comprise such a seating possibility. A corresponding design is however also conceivable without the presence of an intermediate piece. In other words, provision can be made according to the invention such that the two housing parts each comprise a seating section for the sealing seating of the shut-off section and the shut-off body can be rotated via the switching shaft through at least 180° from a first closed position, in which the shut-off section abuts against the seating section of one of the housing parts, into a second closed position, in which the shut-off section abuts against the seating section of the other of the housing parts.

In the case where the ball valve according to the invention, i.e. the shut-off valve with a shut-off body comprising a shut-off section constituted as a spherical segment, is provided with a drainage valve in the form of a hollow spindle mounted in the switching shaft, the hollow spindle comprises according to a further embodiment a section which, at the end of the switching shaft facing away from the shut-off body, projects out of the latter. This projecting section can have various functions. Thus, it is conceivable for a section to be provided with peripheral projections, in particular tooth-shaped in cross-section, by means of which the possibility of connecting a hose to the hollow spindle is created in a straightforward manner. A hexagon can also be formed on the projecting section, by means of which hexagon the hollow spindle can be rotated relative to the switching shaft by means of a tool. If the hollow spindle is provided with an external thread and the switching shaft is provided with an internal thread interacting therewith, the hollow spindle can be displaced axially with respect to the switching shaft by rotating the hollow spindle relative to the switching shaft, so that the drainage opening can thus be cleared or closed.

As already mentioned, the hollow spindle can also be formed by at least two spindle parts connected rotatably to one another. This is particularly advantageous when a hose is fixed to one of the spindle parts, so that, when the other spindle part is rotated relative to the switching shaft, the spindle part connected to the hose and accordingly also the hose are not rotated along with it.

According to yet another embodiment of the shut-off valve according to the invention, a handle, which is also understood to mean hand levers or hand wheels, is connected in a rotationally fixed manner to the switching shaft, in particular its end facing away from the shut-off body. Such a handle permits rotation of the switching shaft between a closed position and an open position in an easy manner. A handle, however, also has the advantage that the latter protects the switching shaft and, if present, a section of the hollow spindle projecting out of the switching shaft. For this purpose, provision can be made such that the handle radially surrounds the section of the hollow spindle that projects out of the switching shaft. A still better protection is achieved by the fact that the handle comprises a removable cap which covers the switching shaft and/or the hollow spindle in the axial direction.

As described above, the hollow spindle can be mounted in the switching shaft, for example by means of a threaded connection, in such a way that the hollow spindle can be displaced relative to the switching shaft in the axial direction. According to an embodiment of the shut-off valve, provision is made such that the hollow spindle is moved in the direction of the shut-off body from the second position, in which the inlet opening is closed, into the first position, in which the drainage channel is in a fluid connection with the flow path via the inlet opening. In order to open the inlet opening of the hollow spindle, the hollow spindle is not therefore displaced out of the housing as in the prior art, but rather into the latter, which further enables reduced external dimensions of the shut-off valve.

According to a second teaching of the present invention with a shut-off valve for the plumbing sector for shutting off a line through which a fluid can flow, in particular a shut-off valve as described above, with a housing comprising at least two connecting pieces, which can be connected to the line in particular by pressing, wherein a flow path is defined from one of the connecting pieces through the housing to another of the connecting pieces, with a shut-off body disposed rotatably in the housing with at least one shut-off section running crosswise to the flow path, wherein the shut-off body can be moved between a closed position in which the flow path is completely blocked and an open position in which the flow path is completely clear, wherein the at least one shut-off section at least partially blocks the flow path to one of the connecting pieces in the closed position, with a switching shaft which is rotatably mounted in the housing and which is connected in a rotationally fixed manner at its one end to the shut-off body, and with a hollow spindle mounted in the switching shaft, which is constituted as a hollow shaft, with an inlet opening at its end facing the shut-off body, an outlet opening at its end facing away from the shut-off body and a drainage channel leading from the inlet opening to the outlet opening, wherein the hollow spindle can be displaced relative to the switching shaft from a first position, in which the drainage channel is in a fluid connection with the flow path via the inlet opening, into a second position, in which the inlet opening is closed, the previously derived and presented problem is further solved by the fact that the shut-off body is constituted at least in sections as a hollow or solid sphere.

Through the provision of a shut-off body constituted at least in sections as a hollow or solid sphere, with at the same time the presence of a drainage valve integrated into the shut-off mechanism or the switching shaft, the advantages of a spherical shut-off body with the small dimensions of the shut-off valve are for the first time combined with a drainage valve integrated into the switching shaft in a shut-off valve.

All the previously described embodiments of a shut-off valve according to the first and the second teaching of the present invention have optimum accessibility, since the drainage through the switching shaft always points, or proceeds, in the direction of the user. Due to the integration of the drainage valve in the switching shaft, no additional space requirement in the housing is necessary for a separate drainage valve. Shut-off bodies with a spherical segment shape, unlike solid spheres, do not have dead spaces or edges which hold back the fluid during drainage and promote the accumulation of germs.

In the preceding embodiments, the switching shaft can be assembled from above into the housing and can be secured against blowout by a snap ring. When the shut-off valve is assembled, moreover, a sealing ring running around the axis of rotation of the switching shaft can be inserted between the outer side of the switching shaft and the inner side of the housing. At least two sealing rings, which are disposed running around the axis of rotation, can also be inserted between the outer side of the hollow spindle and the inner side of the switching shaft, wherein one sealing ring is provided in the axial direction above the inlet opening of the hollow spindle and the other sealing ring is provided in the axial direction below the inlet opening. A further sealing ring is disposed in the region of the seating section in the housing interior between the outer side of the respective shut-off section and the inner side of the housing. Individual or all sealing rings can be constituted as O-rings.

In order to simplify the assembly of the shut-off valve, the switching shaft and the hollow spindle can be preassembled as a structural unit and inserted together into the housing. In addition, the structural unit can also comprise the handle. The structural unit is preferably produced by preassembling the hollow spindle, the switching shaft, the handle, a snap ring 10 (see FIG. 1) and preferably all the sealing rings, in particular O-rings. The structural unit can then be inserted into the housing of the shut-off valve and can be secured in particular by the snap ring or comparable measures against blowout.

The drainage takes place for example by the fact that the shut-off valve or shut-off body is first brought into the closed position and then, if it is present, the cap is dismantled from the handle, in particular two-part handle. A hose is then placed onto the externally projecting end of the hollow spindle. The hollow spindle is then rotated manually or with a tool relative to the switching shaft. The drainage valve is thereby opened.

In case that the shut-off body has been incorrectly assembled or the other side of the line is to be drained, the handle together with the cap can be dismantled. The switching shaft can then be rotated, for example with a tool, through 180° in order to reach another (closed) position. The handle can then be refitted. The position of the handle relative to the switching shaft can be unequivocally fixed by a special, in particular asymmetrical, outer contour of the switching shaft and a corresponding inner contour of the handle. It is also conceivable to show the drainage direction, i.e. the position of the shut-off body, on the handle.

Figure 2A:
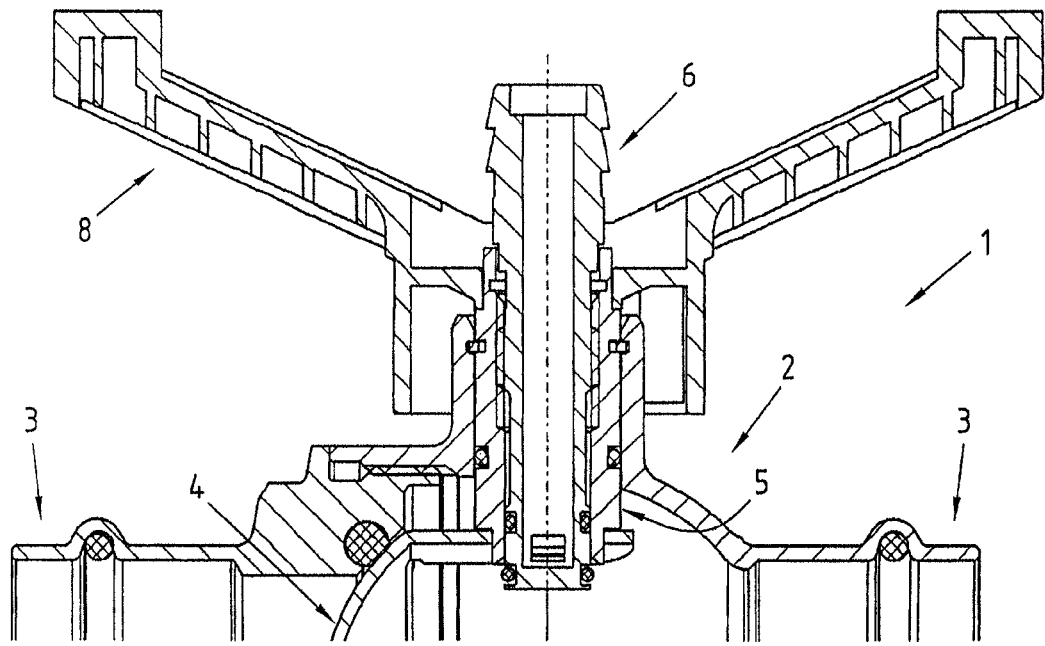
Figure 3:
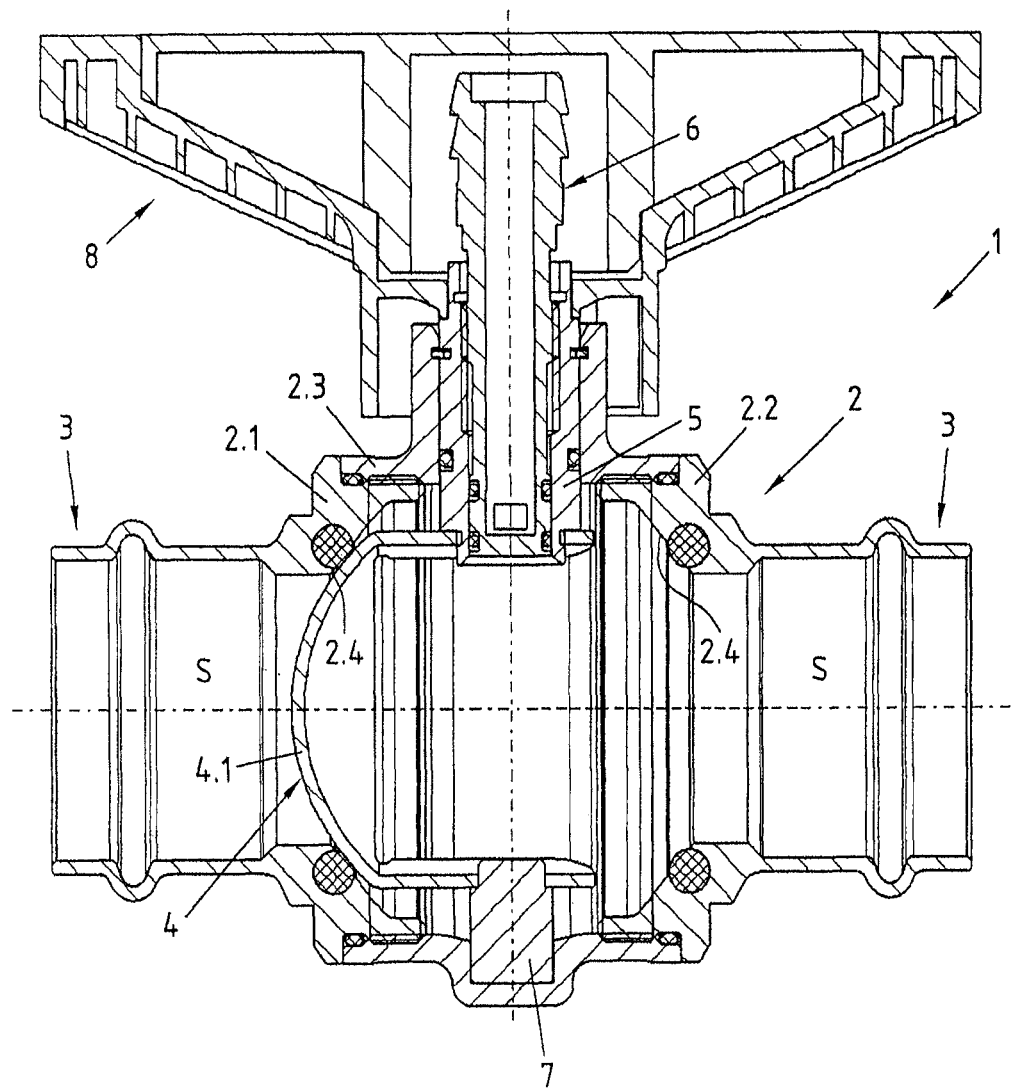
Figure 4:
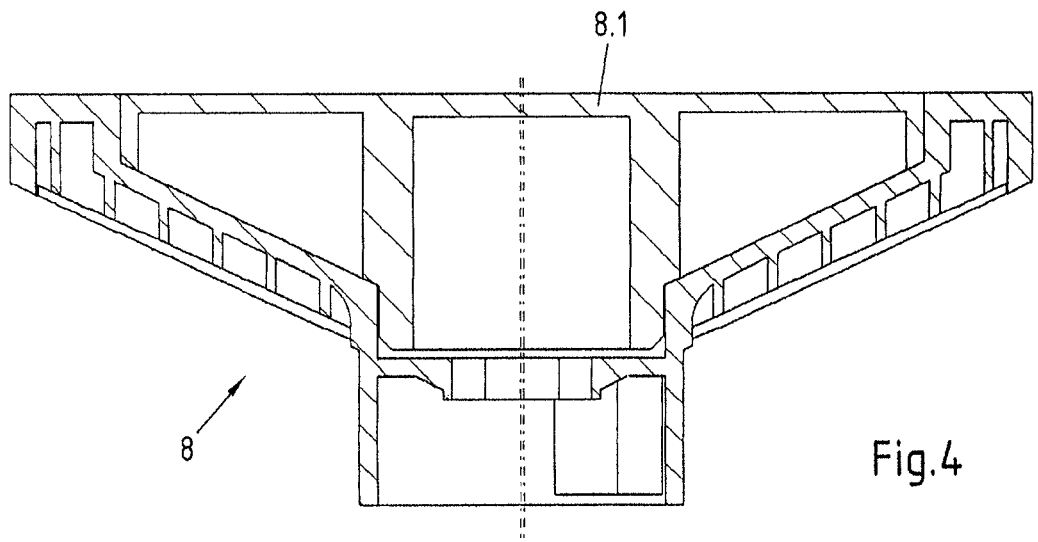
Figure 5:
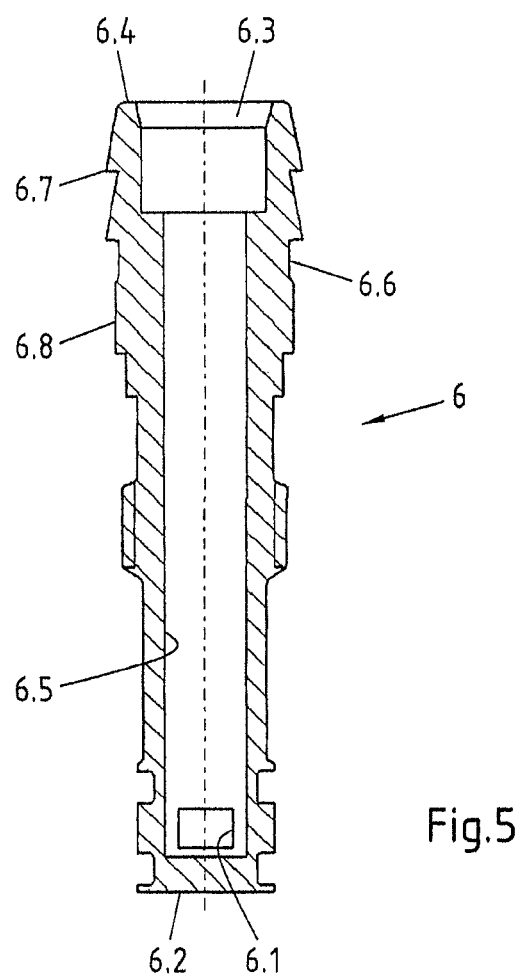
Figure 6:
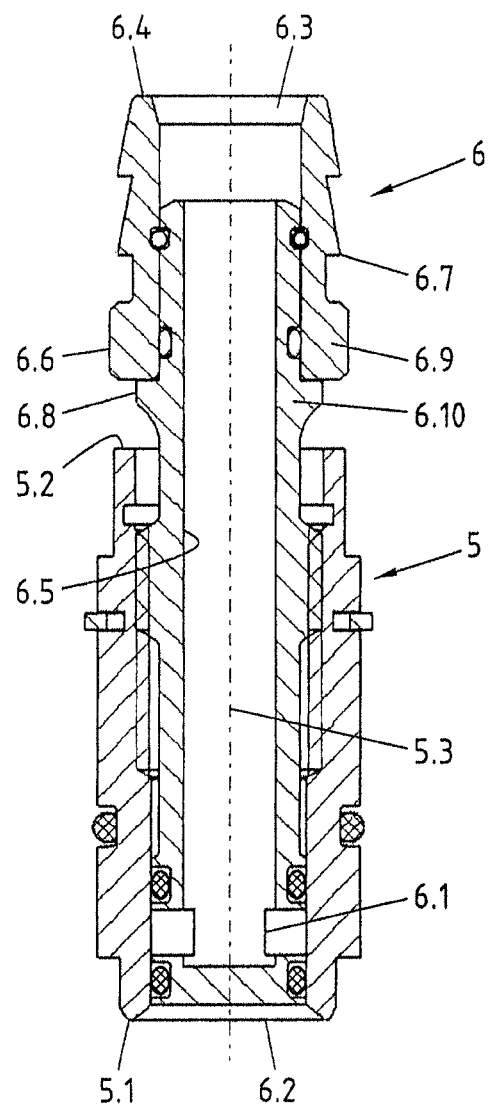
Figure 7:
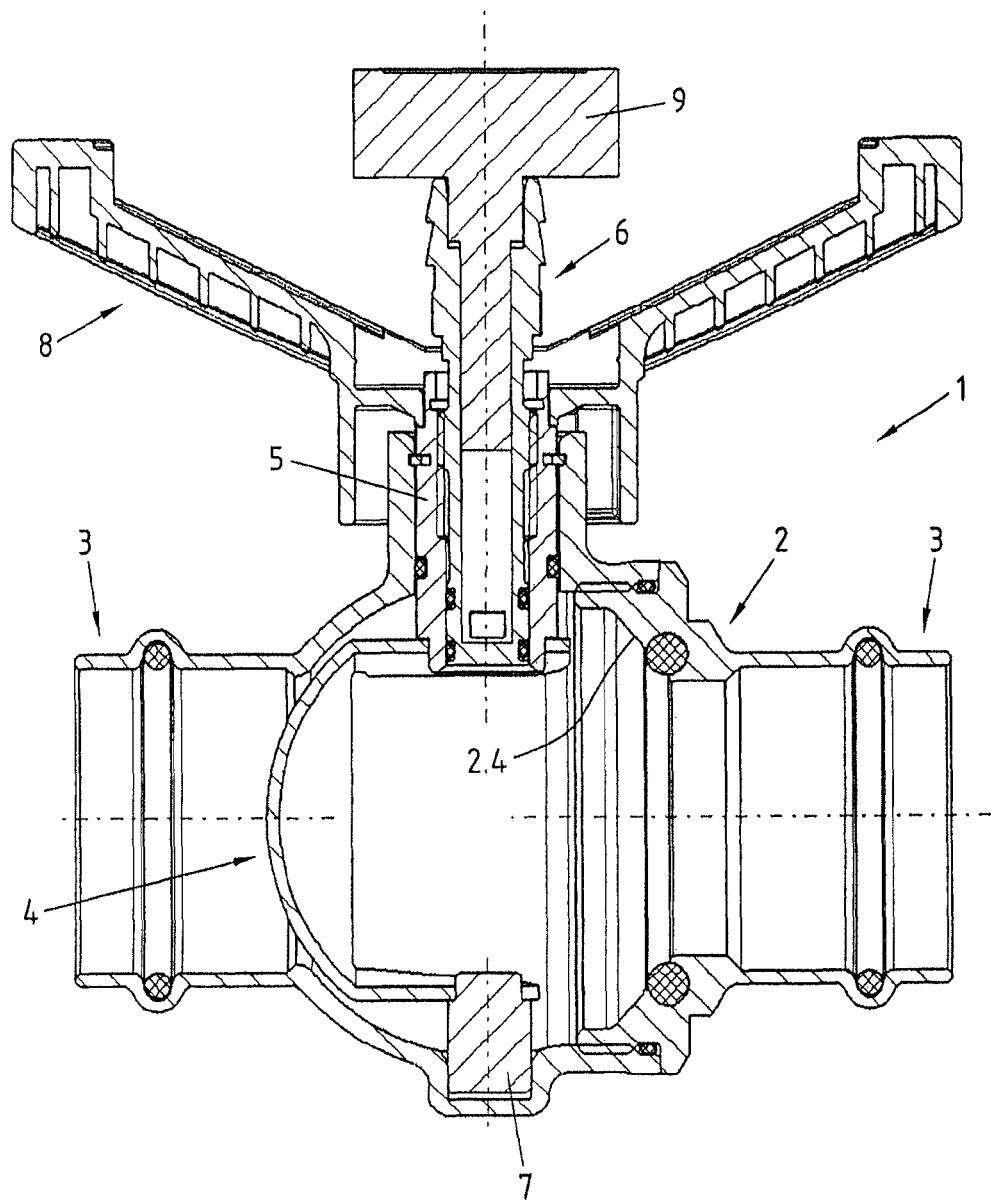

There are a large number of possible ways of embodying and further developing the shut-off valve according to the invention. In this regard, reference is made on the one hand to the claims following claim 1, and on the other hand to the description of examples of embodiment in connection with the drawing. In the drawing:

FIG. 1 shows a first example of embodiment of a shut-off valve,

FIG. 2a) and b) show a drainage procedure by means of the shut-off valve from FIG. 1, FIG. 3 shows another example of embodiment of a shut-off valve, FIG. 4 shows a handle for a shut-off valve according to FIG. 1 or FIG. 3, FIG. 5 shows a hollow spindle for a shut-off valve according to FIG. 1 or FIG. 3, FIG. 6 shows an assembly unit comprising another hollow spindle and a switching shaft and FIG. 7 shows a temperature measuring procedure with a shut-off valve according to FIG. 1.

FIG. 1 shows in cross-section a shut-off valve 1 for the plumbing sector for shutting off a line through which a fluid can flow (not represented). Shut-off valve 1 comprises a housing 2 with a first housing part 2.1 and a second housing part 2.2, wherein the housing comprises connecting pieces 3, which can be connected to the line by pressing, in particular by cold forming by means of a pressing tool, wherein a flow path S is defined from one of connecting pieces 3 through housing 2 to the other of connecting pieces 3.

Disposed rotatably in housing 2 is a shut-off body 4, which precisely comprises a shut-off section 4.1, which (in the closed position) runs crosswise to flow path S. Shut-off body 4 can be moved between the closed position represented in FIG. 1 and the open position represented in FIG. 7. In the closed position, flow path S is completely blocked. In the open position, flow path S is completely clear. Shut-off body 4 comprises an upper side 4.2 and a lower side 4.4, wherein a first connection section 4.3 is formed at the upper side on shut-off section 4.1 and a second connection section 4.5 is formed at the lower side on shut-off section 4.1.

Furthermore, a switching shaft 5 is mounted rotatably with a lower end 5.1 and an upper end 5.2 in housing 2 or second housing part 2.2 about a central axis or axis of rotation 5.3.

Switching shaft 5 is connected at its lower end 5.1 in a rotationally fixed manner to shut-off body 4.

Figure 2B:
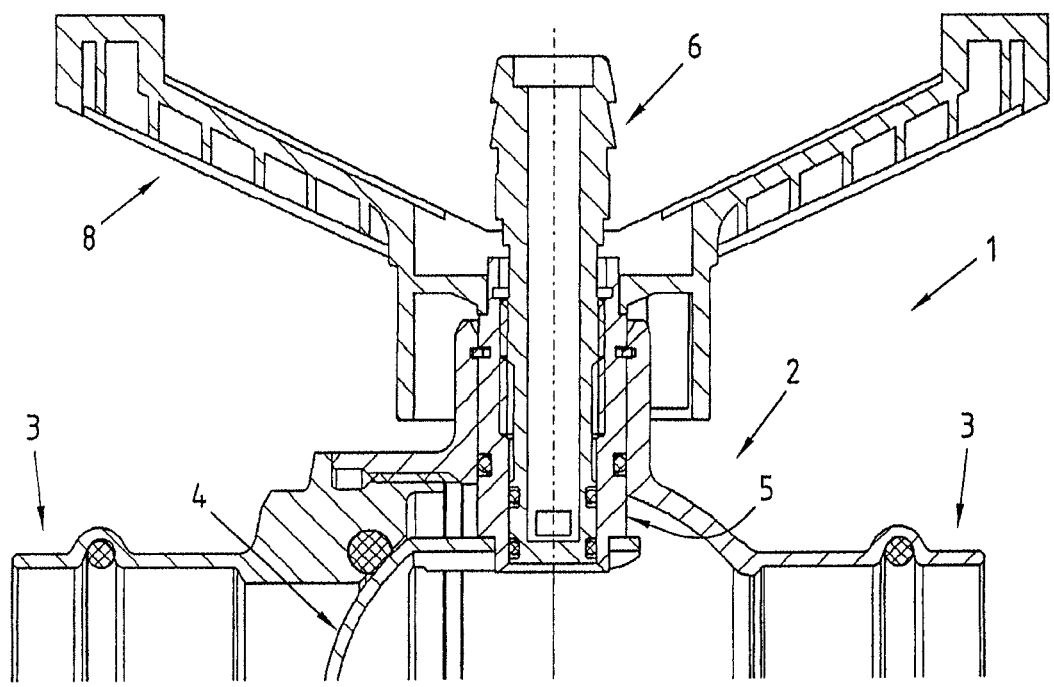

A hollow spindle 6 is mounted in switching shaft 5, which is constituted here as a hollow shaft. Hollow spindle 6 comprises an inlet opening 6.1 at its lower end 6.2, an outlet opening 6.3 at its upper end 6.4 and a drainage channel 6.5 lying in between. Hollow spindle 6 can be displaced relative to switching shaft 5 from a first position, in which drainage channel 6.5 is in a fluid connection via inlet opening 6.1 with flow path S, i.e. the interior of housing 2, to a second position, in which inlet opening 6.1 is closed. The first position is represented in FIG. 2a), the second position is represented in FIG. 2b). The displacement of hollow spindle 6 inside switching shaft 5 takes place by a rotary and translatory movement.

Hollow spindle 6 comprises a section 6.6, which projects out of switching shaft 5 and which is provided with toothed peripheral projections 6.7 and a hexagon 6.8. Projections 6.7 permit the sealing connection of a hose. Hexagon 6.8 permits the fitting of a tool for rotating hollow spindle 6.

Shut-off body 4 is constituted in sections as a hollow sphere, and in such a way that single shut-off section 4.1 forms a spherical segment. In contrast with the prior art, shut-off body 4 is not therefore constituted rotation-symmetrical. Shut-off section 4.1 of shut-off body 4, which is constituted here as a segment of a hollow sphere, comprises, as stated, a first connection section 4.3 and a second connection section 4.5. Shut-off body 4 is connected by a first connection section 4.3 to switching shaft 5 and by second connection section 4.5 to a bolt-shaped bearing element 7. Switching shaft 5 is therefore connected only to upper side 4.2 or first connection section 4.3 of the shut-off body, not more than 10% of the length of switching shaft 5 projecting into shut-off body 4.

Overall shut-off body 4 comprising shut-off section 4.1, first connection section 4.3 and second connection section 4.5 is constituted in one piece, and more precisely by a sheet-metal shaped part with uniform wall thickness. Shut-off body 4 has a U-shaped cross-section, wherein more than 90% of shut-off body 4, which is intended to mean the shut-off body material, is disposed on the left-hand side of axis of rotation 5.3 represented in FIG. 1.

For the drainage, switching shaft 5 is first rotated into the position represented in FIG. 1, which forms the closed position. As represented in FIG. 2a), hollow spindle 6 is then displaced relative to switching shaft 5 in the direction of the interior of housing 2, so that the fluid can flow out via inlet opening 6.1 of hollow spindle 6. After the drainage procedure, hollow spindle 6 is displaced again in the other direction relative to switching shaft 5 and reaches the position shown in FIG. 2b).

As stated, housing 2 is constituted in two parts in FIGS. 1, 2a) and 2b), i.e. comprises a first housing part 2.1 and a second housing part 2.2. As shown in FIG. 3, the housing can also alternatively be constituted in three parts and additionally comprise an intermediate piece 2.3. In the case of FIG. 3, the housing is constituted symmetrical, so that, apart from the closed position shown in FIG. 3, a further closed position is reached after a rotation of shut-off body 4 through 180°. Here, therefore, both first housing part 2.1 and second housing part 2.2 have an inner seating section 2.4 for shut-off section 4.1 of shut-off body 4.

As could already be seen in FIGS. 2a) and b), a cap 8.1, which is a component of two-part handle 8, is removed for the actuation of hollow spindle 6. Handle 8 is represented in detail in FIG. 4. Handle 8, as can clearly be seen, is matched on the inside to a particular outer contour of switching shaft 5, so that handle 8 fits on switching shaft 5 only in a specific position. Handle 8 is formed such that, as shown in FIG. 1 and FIG. 3, section 6.6 of hollow spindle 6 projecting from switching shaft 5 is surrounded in the radial direction by handle 8. In the axial direction, section 6.6 of hollow spindle 6 and switching shaft 5 are covered by cap 8.1.

FIG. 5 shows a detailed sectional view of a first example of embodiment of a hollow spindle 6, which is constituted in one piece in the present case. Hollow spindle 6 comprises an inlet opening 6.1, an outlet opening 6.3 and a drainage channel 6.5 disposed in between. Furthermore, already described projections 6.7 and already described hexagon 6.8 are provided.

In contrast with FIG. 5, FIG. 6 shows a two-part embodiment of a hollow spindle 6, wherein a spindle part 6.9 can be rotated relative to a further spindle part 6.10. Hexagon 6.8 is a component of spindle part 6.10 and projections 6.7 are a component of spindle part 6.9 rotatable relative thereto. If hollow spindle 6 is rotated by means of a tool engaging with hexagon 6.8, a hose pushed onto projections 6.7 is not therefore rotated along with it.

It is also represented in FIG. 6 that hollow spindle 6 and switching shaft 5 can be put together as a preassembled unit. This assembly unit can additionally comprise handle 8 shown in FIG. 4. In principle, one-part hollow spindle 6 from FIG. 5 can of course also be provided instead of two-part spindle 6 in the assembly unit.

Finally, FIG. 7 shows a possible application of shut-off valve 1 for measuring the temperature of the fluid. After cap 8.1 of handle 8 has been removed, a thermometer 9 can be introduced from above into hollow spindle 6 for this purpose. Shut-off body 4 is in the open position for the temperature measurement, so that a through-flow of flow path S is present. The temperature of the fluid is transmitted via housing 2, switching shaft 5 and hollow spindle 6 to thermometer 9, since all the components are made of metal in this example of embodiment.

The invention claimed is:

1. A shut-off valve for the plumbing sector for shutting off a line through which a fluid can flow, comprising:
    a housing comprising at least two connecting pieces, wherein a flow path is defined from one of the connecting pieces through the housing to another of the connecting pieces;
    a shut-off body disposed rotatably in the housing, wherein the shut-off body comprises only a single shut-off section that is constituted as a portion of a sphere, wherein the shut-off body is movable between a closed position in which the shut-off section completely blocks the flow path to only one of the connecting pieces and an open position in which the shut-off section does not block the flow path;
    a switching shaft rotatably mounted in the housing, wherein the switching shaft is constituted as a hollow shaft and is connected in a rotationally fixed manner at one end to the shut-off body; and
    a hollow spindle mounted in the switching shaft, wherein the hollow spindle is provided with an inlet opening at an end facing the shut-off body, an outlet opening at an end facing away from the shut-off body and a drainage channel that leads from the inlet opening to the outlet opening, wherein the hollow spindle is displaceable relative to the switching shaft from a first position, in which the drainage channel is in fluid communication with the flow path via the inlet opening, to a second position, in which the drainage channel is not in fluid communication with the flow path and the inlet opening is blocked, and wherein the hollow spindle is formed by at least two spindle parts connected rotatably to one another.

2. The shut-off valve according to claim 1, wherein the shut-off section is constituted as a portion of one of a hollow sphere and a solid sphere.

3. The shut-off valve according to claim 1, wherein the shut-off body comprises a first connection section, by means of which the shut-off section is connected in a rotationally fixed manner to the switching shaft.

4. The shut-off valve according to claim 1, wherein the shut-off body is connected rotatably at its underside facing away from the switching shaft to the housing by means of a bearing element.

5. The shut-off valve according to claim 4, wherein the shut-off body comprises a second connection section, by means of which the shut-off section is connected in a rotationally fixed manner to the bearing element.

6. The shut-off valve according to claim 3, wherein the shut-off section and at least one of the first and second connection section are constituted in one piece with one another.

7. The shut-off valve according to claim 1, wherein the shut-off body is a sheet-metal shaped part, which has a uniform wall thickness.

8. The shut-off valve according to claim 1, wherein the housing comprises a first housing part, which contains one of the connecting pieces, and a second housing part, which contains another of the connecting pieces, wherein the two housing parts are connected to one another via an intermediate piece.

9. The shut-off valve according to claim 8, wherein the intermediate piece accommodates the switching shaft.

10. The shut-off valve according to claim 8, wherein the two housing parts each comprise a seating section, and wherein the shut-off body can be rotated via the switching shaft through at least 180° from a first closed position, in which the shut-off section abuts against the seating section of one of the housing parts, into a second closed position, in which the shut-off section abuts against the seating section of the other of the housing parts.

11. The shut-off valve according to claim 1, wherein the hollow spindle comprises a section which, at the end of the switching shaft facing away from the shut-off body, projects out of the latter.

12. The shut-off valve according to claim 11, wherein the section is provided with one or a plurality of peripheral projections, and wherein a hexagon is formed on the section.

13. The shut-off valve according to claim 1, wherein a handle is connected in a rotationally fixed manner to the switching shaft.

14. The shut-off valve according to claim 11, wherein a handle is connected in a rotationally fixed manner to the switching shaft, and wherein the handle radially surrounds the section of the hollow spindle that projects out of the switching shaft.

15. The shut-off valve according to claim 13, wherein the handle comprises a removable cap which covers one of the switching shaft and the hollow spindle in an axial direction.

16. The shut-off valve according to claim 1, wherein the hollow spindle is movable in a direction toward the shut-off body from the second position, in which the inlet opening is blocked, into the first position, in which the drainage channel is in fluid communication with the flow path via the inlet opening.

17. A method for the production of a shut-off valve according to claim 13, the method comprising:
  preassembling the switching shaft, the hollow spindle and the handle as a structural unit;
  inserting the structural unit into the housing; and
  securing the structural unit inserted into the housing against blowout by means of a snap ring.

* * * * *